Patented May 10, 1932

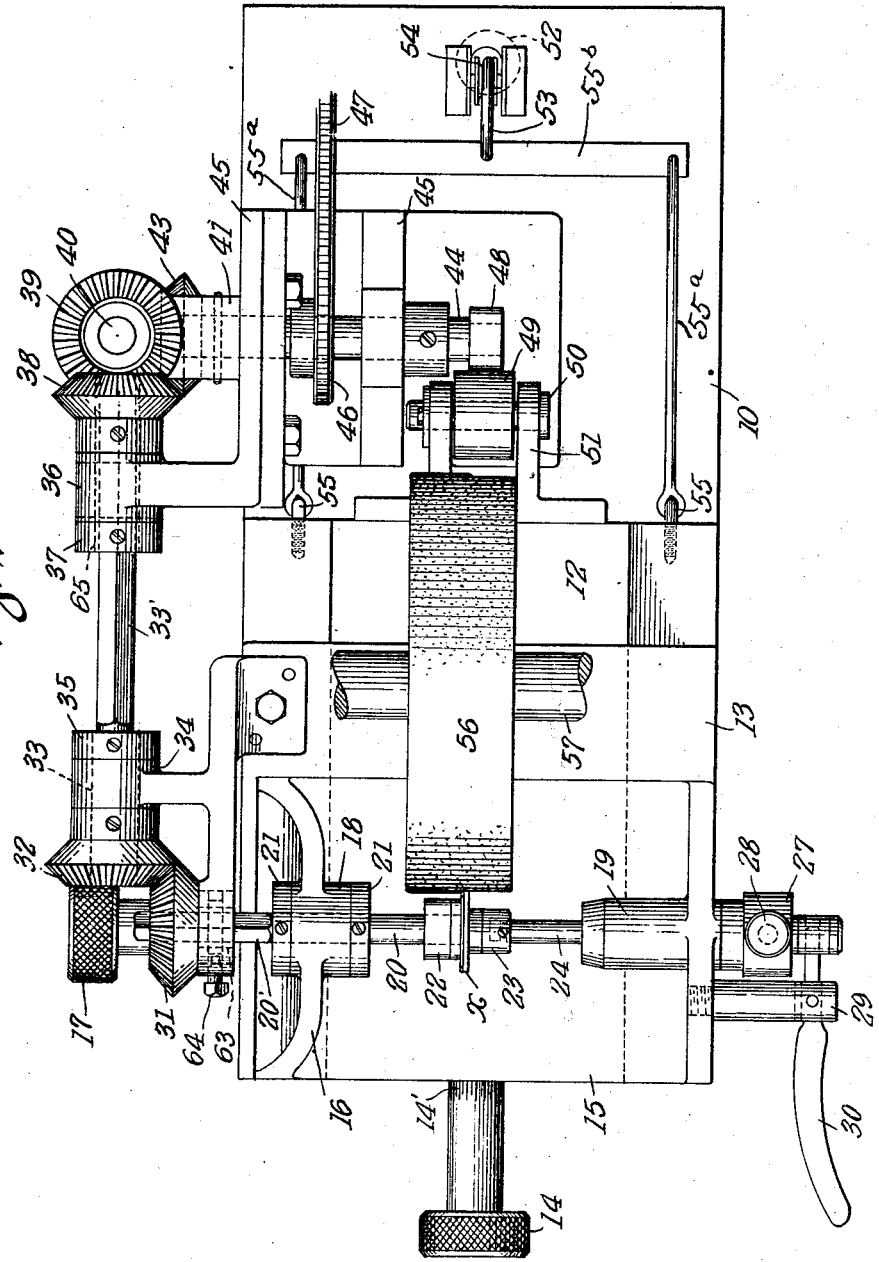

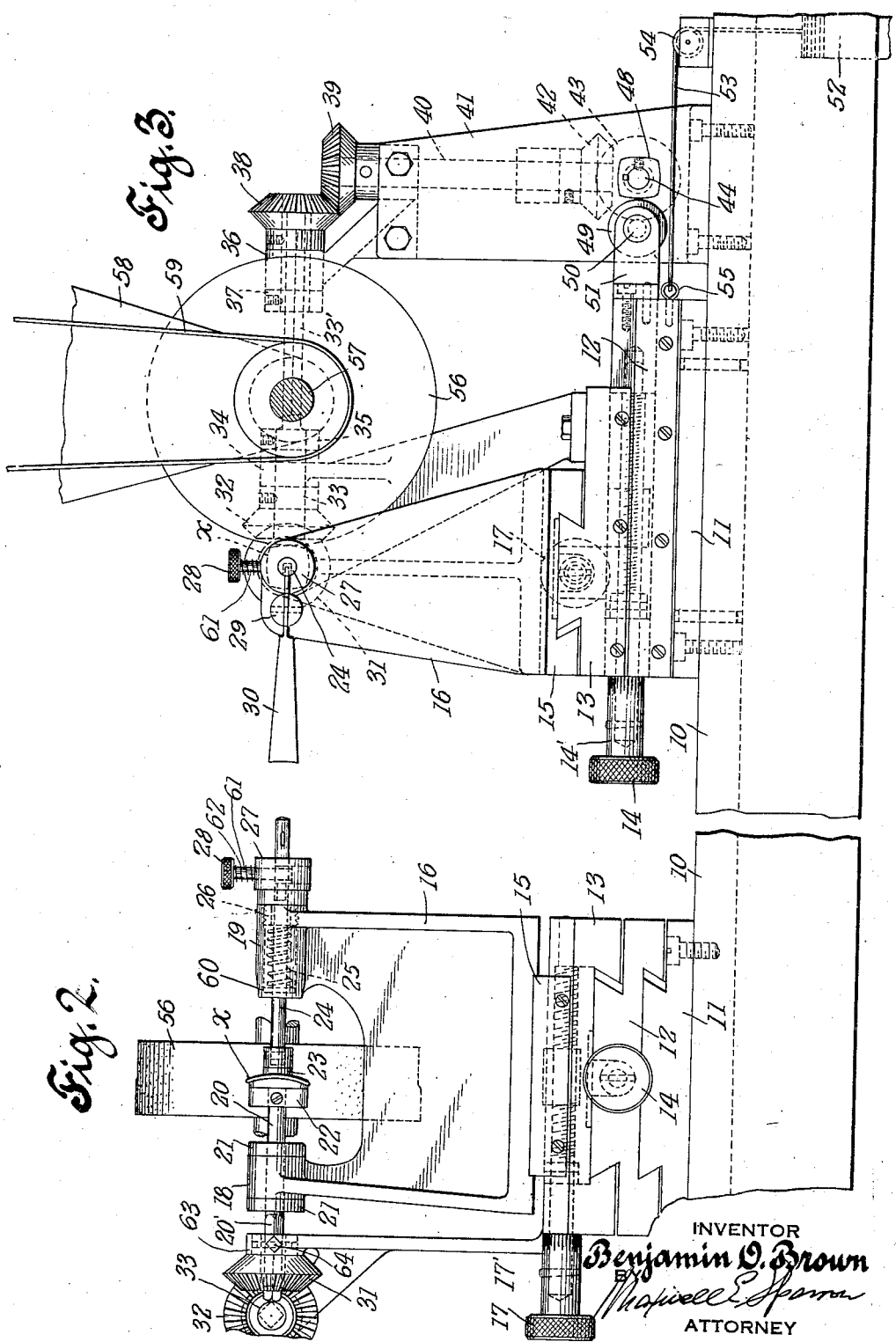

1,857,777

UNITED STATES PATENT OFFICE

BENJAMIN D. BROWN, OF NEW YORK, N. Y.

AUTOMATIC IRREGULAR CONTOUR SHAPING MACHINE

Application filed February 4, 1930. Serial No. 425,766.

This invention relates to irregular contour profiling machines and more specifically to a type adapted to produce a given shape on watch crystals or lenses' edge for spectacle frame fitting and analogous objects.

One of the objects of the invention is to provide a machine in which a tool or grinding wheel, or its equivalent, is used in reducing the edges in conformity with a master or former cam of the exact contour desired, but which may vary in dimensions from the finished article.

A further feature is in the provision of a machine which is entirely automatic in its operation and capable of producing duplicate articles, requiring only the substitution of blanks for the completed product.

A further object of the invention is to provide a contour shaping device wherein slides are provided whereby a work part and the shaper may be moved parallelly and transversely with relation to each other and wherein the master cam is adapted to operate in synchronism with the work part, provision being made in the device to oscillate the work part in conformity with the contour of the master cam.

Other advantageous purposes, such as reliability, convenience of adjustment and moderate space required, together with the foregoing, are attained by the novel construction, combination and arrangement of parts as hereinafter described and shown in the accompanying drawings, which constitute a material part of this disclosure, and in which:

Figure 1 is a top plan view of an embodiment of a machine made in accordance with the invention.

Figure 2 is a partial side elevational view of the same, drawn to a slightly reduced scale.

Figure 3 is a front view thereof.

The device is mounted upon a stand, generally indicated by the numeral 10, having at one end a fixed undercut bed 11, upon which is mounted a longitudinal sliding bed 12, also undercut to receive a longitudinal slide 13, operated by a screw and nut connection controlled by the knob 14 fixed at the end of a graduated sleeve 14', whereby minute adjustments of slide 13 can be made.

Mounted in the slide 13, is a transverse or cross slide 15 having a double, webbed bracket 16, the slide being actuated by a nut and screw connection controlled by the knob 17, fixed at the end of a graduated sleeve 17', whereby minute adjustments of slide 15 can be made.

At the upper part of the bracket are bearings 18 and 19, in the former of which is journalled a rotatable shaft 20, provided with collars 21 to prevent end movement.

On the inner reduced portion of the shaft 20 is a removable receiving head 22 for a work part X, which may be pressed by a correspondingly shaped plunger element 23, rotatably mounted on the inner end of a spindle 24 urged in the direction of the head by an enclosed helically coiled spring 25, disposed within the bearing 19 and held under tension by a screw 26 internally threaded in the bearing.

The spindle and plunger element is limited in forward movement by the shoulder 60. Set in the bracket 16 is a forked stud 29 to pivotally carry a hand lever 30, having its forward end engaged with the spindle 24, in a manner to retract the plunger element 23 and release the work part X, when desired. A detent pin 61 is slidably mounted transversely in the collar 27, the extending end of which has secured to it a knurled hand knob 28 equipped with an encircling compression spring 62 pressing the detent into a normally engaging position with the spindle 24 to keep the latter in retracted position. Upon pressing knob 28 the spindle 24 is released.

The squared end 20' of the shaft 20 is slidably mounted in the hub of a bevel gear 31, the latter meshing with a mating gear 32 mounted on a shaft 33 held in a bearing 34 at right angles to the bearings 18 and 19, mounted on the slide 13, and provided with stop collars 35, as best seen in Figure 1. The hub of gear 31 is free to rotate in bearing 63, endwise movement being prevented by means of a set screw 64 which fits in a groove of the hub.

The outer portion of the shaft 33 is squared, as at 33', to extend through a square bored sleeve 65 which rotates in bearing 36, fixed on a stationary part of the apparatus and which sleeve is provided with stop collars 37, the sleeve having at its opposite end a bevel gear 38 meshing with the mating gear 39 fixed on a vertical shaft 40, and carried in a bracket 41 mounted on the base 10. It is understood that a construction identical with that described in this paragraph may be employed for sliding the shaft with relation to gear 31 in lieu of that described in the preceding paragraph.

The opposite end of the shaft 40 has fixed on it a bevel gear 42 meshing with a mating gear 43, fixed on a shaft 44, parallel with the shaft 20, being mounted in brackets 45 extending up from the base 10, and is driven by a sprocket 46, over which is trained a chain 47 from any convenient source of rotary motion.

On the outer end of the shaft 44 is a former or master cam 48, the same being receptive of the thrust of a roll 49, mounted on a pivot 50 carried in brackets 51 attached to the sliding bed 12, so that the bed and elements carried thereby are moved outwardly by the cam and drawn toward the cam by a weight 52 attached to a cord 53, trained over a pulley 54; eye bolts 55 being provided in the slide 12 to which are attached rods 55a connected by a bridge 55b to which is secured the cord 53, centrally thereof.

An abrading wheel 56 is mounted on a spindle 57 carried in a bracket 58 and driven by a belt 59, as best seen in Figure 3. This wheel may be formed with a number of unequal diameters for special edging purposes and its axis is in the plane of the spindles 20 and 24, while its operative face is disposed adjacent to the work holding head 22.

It is to be understood that instead of the abrading wheel 56 any suitable cutter or other tool may be employed.

In operation the lever 30 is pressed inwardly, thereby retracting the plunger 23 which, as can be seen, is rotatably mounted on the spindle 24 to permit it to turn with the part X. Obviously upon retraction of the lever, the work part is released, presumably in its complete form, and an unground blank substituted; as the master cam 48, is driven by the gear train in exact synchronism with the work carrying head, the part X will eventually be ground in accordance with the shape of the former, due to the movement of the sliding bed 12 which carries the compound slides 13 and 15.

Variation in size of the work part from that of the former is easily accomplished by rotation of the knob 14, moving the slide 13 relative to the cam actuated sliding bed 12, and it will be apparent that upon actuating the knob 17, the work part may be transversed across the face of the abrading wheel, due to the movement of the slide 15 transversely on the slide 13.

From the foregoing it will be seen that a compact apparatus has been disclosed, capable of automatically forming watch crystals or lenses or like work parts in exact accordance with the profile of the former cam, but variable therefrom in diameter as may be desired. The simplicity of the apparatus is such that it may be accurately operated by even an unskilled person without difficulty.

From the above description it will be seen that the clamp-holder 22 for holding the work part X is mounted on the cross slide 15, the latter being mounted on the longitudinal slide 13 and adapted to be moved across the longitudinal slide 13 by means of a cross slide screw controlled by the knob 17 to present new area of contact between the work part X and cutting or grinding wheel 56; the longitudinal slide 13 being adapted to be moved by means of another screw controlled by the knob 14 to any predetermined position with relation to the sliding bed 12 carrying the roller 49 and then set, the roller tending to keep in contact with the driven master or former cam 48 mounted through bracket 41 on the stationary bed. The grinding or cutting wheel 56 is driven independently and is mounted in stationary position.

It is to be understood that the same results may be obtained by having the master cam or former and the clamp-holder holding the work part on the same shaft, concentric, and mounted on the sliding bed 12, with the roller and the cutter or grinding wheel on slides mounted on the stationary bed, with the cam or former operating against the roller, adjustments for wear and for new line of contact on the face of the wheel being obtained by movements of the longitudinal and cross slides mounted on the stationary bed. Or the same results may be obtained by having the work part and master cam on a concentric shaft mounted on the stationary bed and the roller on slides on the sliding bed holding the grinding wheel, adjustments for wear on grinding wheel and side movement of the wheel being again obtained by means of the longitudinal and cross slides on the sliding bed.

It is to be further understood that the master cam, work part, and cutting or grinding wheel may be in horizontal position; or the master cam and work part may be in horizontal position and the cutting or grinding wheel in vertical position.

While I have shown and described a preferred form of embodiment of this invention I am well aware that other modifications may be made and I therefore desire a broad interpretation of the invention within the scope and spirit of the disclosure herein and the claims appended hereto.

Having thus described the invention, what is claimed as new and desired to secure by Letters Patent, is:—

1. In an automatic contour shaper a driven rotary work head, a rotary tool, a slide associated with one of said elements to move it towards and from the other of said elements, another slide associated with one of said elements to move it transversely of the other of said elements, a slidable bed on which the slides are mounted, means for confining a work part against said head, a master cam driven in timed relation to said head, means to oscillate the bed in conformity with the contour of said cam, and manual means for releasing a work part from said head.

2. An automatic contour shaper comprising a spindle rotatable on a horizontal axis, a work part carrying head on said spindle, a tool rotatable in the plane of and adjacent said head, a master former, a gear train for rotating said former and said spindle in synchronism, a compound slide whereby said head is adjusted in a horizontal plane parallelly and transversely relative to said tool independently of said cam, and a slidable bed for moving said slide back and forth in a horizontal plane in conformity with said former.

3. An automatic contour shaper comprising a compound slide having a driven spindle rotatable therein, a work part carrying head detachably fixed on said spindle, a plunger rotatable with said head and spring pressed against a work part held thereon, manual means for retracting said plunger, a rotary tool to operate on the work part, a former cam, means for drawing said slide against said cam, means for driving said cam in synchronism with said head, and means for adjusting said slide relative to said tool independently of said cam.

4. An automatic contour grinder comprising a stand having a fixed bracket at one end and a longitudinal sliding bed at the other end, a longitudinal slide movable in the sliding bed, a cross slide movable in the longitudinal slide, a spindle journalled in the longitudinal slide and slidable in said bracket, a work carrying spindle in the cross slide gear connected with said former spindle having a head to receive work parts, a master former gear-connected with said first spindle, a roll on the sliding bed, gravity means for drawing said roll against the former, an abrading wheel rotatable on a fixed axis adjacent the work carrying head, and means for adjusting said slides relative to the face of said wheel.

5. An automatic contour grinder comprising a stand having a fixed bracket at one end and a longitudinal sliding bed at the other end, a longitudinal slide movable in the sliding bed, a cross slide movable in the longitudinal slide, a bracket on the longitudinal slide, a spindle journalled in the latter bracket, having a square portion slidable in the former bracket, a work carrying spindle in the cross slide gear connected with said former spindle and having a head to receive work parts, and a square portion slidable in said latter bracket, a master former gear-connected with said first mentioned spindle, a roll on the sliding bed, gravity means for drawing said roll against the former, an abrading wheel rotatable on a fixed axis adjacent the work carrying head, and means for adjusting said slides relative to the face of said wheel.

6. In a contour shaping device, a work-part holder, a tool adjacent the holder to operate on the work part, a slide for moving one of the members parallelly with relation to an axis of the other member, a slide for moving one of the members transversely with relation to an axis of the other member, a master cam to operate in synchronism with the holder, a slidable bed upon which said slides are mounted, and means to oscillate the bed in a horizontal plane in conformity with the contour of the cam.

7. In a contour shaping device a work-part holder, a tool adjacent the holder to operate on the work part, a slide for moving one of the members parallelly with relation to an axis of the other member, a slide for moving one of the members transversely with relation to an axis of the other member, a master cam to operate in synchronism with the holder, a slidable bed upon which said slides are mounted, means for oscillating the bed in a horizontal plan in conformity with the contour of the cam, and means to minutely vary the size of the work part with relation to the cam.

8. In a contour shaping device, a work-part holder, a tool for shaping the contour of the work part, a compound slide for moving the holder parallelly and transversely with relation to the tool, a master cam to operate in synchronism with the holder, a slidable bed upon which said slides are mounted, and means for oscillating the bed in a horizontal plane.

9. An automatic contour shaper comprising a longitudinal sliding bed, a longitudinal slide movable in the sliding bed, a cross slide movable in the longitudinal slide, a work carrying spindle in the cross slide having a head to receive work parts, a master former connected with said spindle, a roller on the sliding bed, means for drawing the roller against the former, a tool rotatable on a fixed axis adjacent the work carrying head, and means for adjusting said slides relative to the face of said tool.

Signed at New York, in the county and State of New York, this 6th day of January, 1930.

BENJAMIN D. BROWN.